United States Patent
Tsirkin et al.

(10) Patent No.: US 10,509,733 B2
(45) Date of Patent: Dec. 17, 2019

(54) KERNEL SAME-PAGE MERGING FOR ENCRYPTED MEMORY

(71) Applicant: Red Hat, Inc., Raleigh, NC (US)

(72) Inventors: Michael Tsirkin, Lexington, MA (US); Henri Han Van Riel, Merrimack, NH (US)

(73) Assignee: Red Hat, Inc., Raleigh, NC (US)

( * ) Notice: Subject to any disclaimer, the term of this patent is extended or adjusted under 35 U.S.C. 154(b) by 329 days.

(21) Appl. No.: 15/468,195

(22) Filed: Mar. 24, 2017

(65) Prior Publication Data

US 2018/0276145 A1 Sep. 27, 2018

(51) Int. Cl.
*G06F 12/14* (2006.01)
*H04L 29/06* (2006.01)
(Continued)

(52) U.S. Cl.
CPC .......... *G06F 12/1408* (2013.01); *G06F 3/067* (2013.01); *G06F 3/0608* (2013.01); *G06F 3/0641* (2013.01); *G06F 9/45558* (2013.01); *H04L 63/061* (2013.01); *G06F 12/1009* (2013.01); *G06F 12/1027* (2013.01); *G06F 2009/45579* (2013.01); *G06F 2009/45583* (2013.01); *G06F 2009/45587* (2013.01); *G06F 2212/1044* (2013.01);
(Continued)

(58) Field of Classification Search
CPC .. G06F 12/1408; G06F 3/0619; G06F 3/0641; G06F 3/065; G06F 3/067; G06F 9/45558; G06F 12/1009; G06F 12/1027; H04L 63/061

See application file for complete search history.

(56) References Cited

U.S. PATENT DOCUMENTS 5,860,094 A 1/1999 Junya
7,484,073 B2 1/2009 Cohen et al.
(Continued)

FOREIGN PATENT DOCUMENTS

WO 2011078861 6/2011

OTHER PUBLICATIONS

"Secure Encrypted Virtualization Key Management", Advanced Micro Devices, publication No. 55766, Aug. 2016, 68 pages.
(Continued)

*Primary Examiner* — Saleh Najjar
*Assistant Examiner* — Louis C Teng
(74) *Attorney, Agent, or Firm* — Lowenstein Sandler LLP

(57) ABSTRACT

Systems and methods for performing data deduplication one storage blocks while the data is encrypted. An example method may comprise: selecting a first storage block and a second storage block from a plurality of encrypted storage blocks, wherein the first storage block and the second storage block are encrypted using different cryptographic input; causing the first storage block and the second storage block to be decrypted and further encrypted using a common cryptographic input; determining that a cipher text of the first storage block and a cipher text of the second storage block are the same; and updating a reference to the first storage block to reference the second storage block in response to the determining that the cipher text of the first storage block and the cipher text of the second storage block are the same.

20 Claims, 6 Drawing Sheets

(51) Int. Cl.
   *G06F 9/455* (2018.01)
   *G06F 3/06* (2006.01)
   *G06F 12/1027* (2016.01)
   *G06F 12/1009* (2016.01)

(52) U.S. Cl.
   CPC ............... *G06F 2212/1052* (2013.01); *G06F 2212/657* (2013.01); *G06F 2212/683* (2013.01)

(56) References Cited

U.S. PATENT DOCUMENTS

| | | |
|---|---|---|
| 7,620,766 B1 | 11/2009 | Waldspurger |
| 8,165,221 B2 | 4/2012 | Zheng et al. |
| 8,495,318 B2 | 7/2013 | Tremaine et al. |
| 8,607,013 B2 | 12/2013 | Chen et al. |
| 8,627,112 B2 | 1/2014 | Chaturvedi et al. |
| 8,713,328 B2 | 4/2014 | Ikeuchi et al. |
| 8,719,545 B2 | 5/2014 | Pandey et al. |
| 8,776,059 B2 | 7/2014 | Reumann et al. |
| 9,042,386 B2 | 5/2015 | Lynar et al. |
| 9,116,849 B2 | 8/2015 | Nayshtut et al. |
| 9,170,950 B2 | 10/2015 | Dube et al. |
| 9,361,145 B1 | 6/2016 | Wilson et al. |
| 9,536,111 B2 | 1/2017 | Sibert |
| 9,563,569 B2 | 2/2017 | Tsirkin |
| 9,729,524 B1* | 8/2017 | Brandwine ......... H04L 63/0457 |
| 9,773,118 B1* | 9/2017 | Bennett ............... G06F 21/6218 |
| 2008/0072072 A1 | 3/2008 | Muraki et al. |
| 2010/0250502 A1 | 9/2010 | Saigo |
| 2012/0030406 A1 | 2/2012 | Chang et al. |
| 2012/0110328 A1* | 5/2012 | Pate .................... G06F 21/6218 713/165 |
| 2012/0144209 A1* | 6/2012 | Kahler ................ G06F 11/1076 713/193 |
| 2012/0216052 A1 | 8/2012 | Dunn |
| 2012/0311327 A1* | 12/2012 | Liu ..................... H04L 63/0435 713/167 |
| 2012/0324239 A1 | 12/2012 | Falk et al. |
| 2013/0097296 A1 | 4/2013 | Gehrmann et al. |
| 2013/0114812 A1 | 5/2013 | Gidwani |
| 2014/0157005 A1 | 6/2014 | Leventhal et al. |
| 2014/0208111 A1 | 7/2014 | Brandwine et al. |
| 2014/0258655 A1* | 9/2014 | Park ..................... G06F 3/0641 711/159 |
| 2015/0046927 A1 | 2/2015 | Rodbro et al. |
| 2015/0100791 A1 | 4/2015 | Chen et al. |
| 2015/0193248 A1 | 7/2015 | Noel et al. |
| 2015/0242159 A1 | 8/2015 | Tsirkin |
| 2015/0248357 A1 | 9/2015 | Kaplan et al. |
| 2015/0318986 A1 | 11/2015 | Novak et al. |
| 2015/0381589 A1 | 12/2015 | Tarasuk-Levin et al. |
| 2016/0026489 A1 | 1/2016 | Maislos et al. |
| 2016/0034296 A1 | 2/2016 | Kedem et al. |
| 2016/0092678 A1 | 3/2016 | Probert et al. |
| 2016/0092702 A1* | 3/2016 | Durham ............... G06F 21/72 713/190 |
| 2016/0266923 A1 | 9/2016 | Miyoshi |
| 2016/0342462 A1 | 11/2016 | Karamanolis et al. |
| 2016/0378522 A1 | 12/2016 | Kaplan et al. |
| 2016/0378688 A1 | 12/2016 | Rozas et al. |
| 2017/0003882 A1 | 1/2017 | Bartik et al. |
| 2017/0032119 A1 | 2/2017 | Dore et al. |
| 2017/0177441 A1 | 6/2017 | Chow |
| 2017/0177862 A1 | 6/2017 | Narendra Trivedi et al. |
| 2017/0206175 A1 | 7/2017 | Sliwa et al. |
| 2017/0262204 A1 | 9/2017 | Dornemann et al. |
| 2017/0357592 A1* | 12/2017 | Tarasuk-Levin .... G06F 12/1009 |
| 2018/0011802 A1 | 1/2018 | Ndu et al. |
| 2018/0032447 A1 | 2/2018 | Kaplan et al. |
| 2018/0060237 A1 | 3/2018 | Leslie-Hurd et al. |
| 2018/0089468 A1 | 3/2018 | Rozas et al. |
| 2018/0189193 A1* | 7/2018 | Bernat ................. H04L 9/088 |
| 2018/0307435 A1 | 10/2018 | van Riel et al. |
| 2019/0057222 A1 | 2/2019 | Bradley |

OTHER PUBLICATIONS

Divyambika, et al., "Protection of Virtual Machines during Live Migration in Cloud Environment", School of Computing, SASTRA University, Thanjavur-613401, Tamil Nadu, India, May 2015, http://www.indjst.org/index.php/indjst/article/viewFile/65589/55379, 7 pages.

Aiash, et al., "Secure Live Virtual Machines Migration: Issues and Solutions", School of Science and Technology Middlesex University, UK, May 2014, https://www.researchgate.netpublication/260763074_Secure_Live_Virtual_Machines_Migration_Issues_and_Solutions, 10 pages.

Steele, "Virtual Machine Migration FAQ: Live Migration, P2V and More", Aug. 2010, http://searchservervirtualization.techtarget.com/feature/Virtual-machine-migration-FAQ-Live-migration-P2V-and-more, 4 pages.

Mashtizadeh, et al., "XvMotion: Unified Virtual Machine Migration over Long Distance", Stanford University; VMware, Inc., Jun. 19-20, 2014, 13 pages.

Kaplan, et al., "AMO Memory Encryption", Advanced Micro Devices, Inc., Apr. 21, 2016, 12 pages.

Resma, et al., "A Hybrid Cloud Approach for Secure Authorized Deduplication", http:1/dsresearchcenter.neUPDF/V2_I15N2-I15-17.pdf, Sep. 2016; 8 pages.

Nirmalrani Vet al., "Efficient Method for Cloud Storage Based on Proof of Ownership", http://www.ijptonline.com/wpoontenUuploads/2016/07/3815-3822.pdf, Jun. 2016; 8 pages.

Tang, et al., "Enabling Ciphertext Deduplication for Secure Cloud Storage and Access Control", http://dl.acm.org/citation.cfm?id=2897846, May 30-Jun. 3, 2016, 2 pages.

Irrain2Brain, "A Hybrid Cloud Approach for Secure Authorized Reduplication", http://www.train2brain.com/courses/ariybrid-cloud-approach-for-secure-authorized-reduplication/, 2 pages.

* cited by examiner

US 10,509,733 B2

KERNEL SAME-PAGE MERGING FOR ENCRYPTED MEMORY

TECHNICAL FIELD

The present disclosure is generally related to data storage management, and more particularly, to the deduplication of encrypted data.

BACKGROUND

Modern computer systems perform data deduplication to improve the utilization of data storage resources. Data duplication is a technique that removes duplicate copies of repeating data to enable more data to be stored within a data storage device. The technique of data duplication may involve identifying unique chunks, or byte patterns, of data that are stored within the data storage resource. The unique chunks are compared to other chunks stored within the data storage resource and when a match occurs, redundant chunks are replaced with a small reference that points to one of the stored chunks. Given that the same chunk or byte pattern may occur dozens, hundreds, or even thousands of times the amount of data that should be stored or transferred can be greatly reduced.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
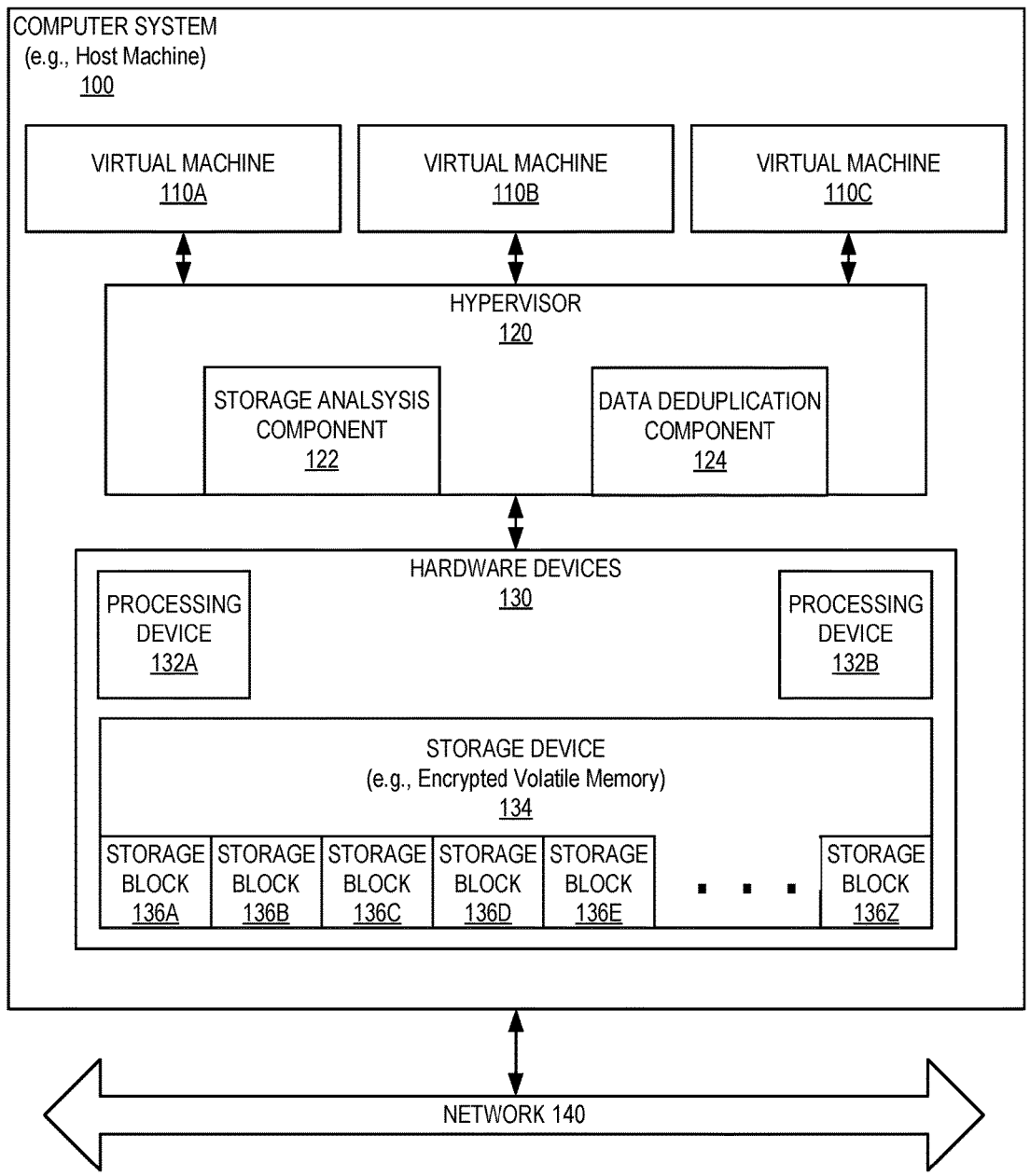
FIG. 1 depicts a high-level block diagram of an example computer system architecture that performs data deduplication of a storage device while the data in the storage device is encrypted, in accordance with one or more aspects of the present disclosure.

Computer systems often use cryptographic functions to encrypt data stored within a storage device. The cryptographic functions often use variations in cryptographic input so that the same content appears different once encrypted. Having different encrypted versions of the same content may cause many data deduplication techniques to be unable to properly or efficiently detect duplicates in the underlying content. In some examples, the cryptographic function may be performed by hardware and underlying executable code (e.g., firmware) and may use cryptographic keys that are concealed from higher-level executable code (e.g., kernel). The higher-level executable code (e.g., hypervisor, host operating system, guest operating system) may therefore have access to an encrypted version of the data without a means to efficiently identify duplicate data in the underlying content and perform data deduplication.

Aspects of the present disclosure address the above and other deficiencies by providing technology to perform data deduplication on encrypted data within a storage device. In one example, executable code of a kernel or other module may select multiple storage blocks that contain encrypted content. The storage blocks may be any portion of data storage that is capable of storing data and may include volatile or non-volatile data storage devices. The encrypted content may be in the form of cipher text that was generated using a cryptographic function and cryptographic input (e.g., cryptographic key). The cryptographic function may be executed by the underlying hardware and some or all of the cryptographic input (e.g., decryption key) may be concealed or temporarily hidden from the kernel. Each storage block may be encrypted using different cryptographic input so that storage blocks with identical unencrypted content (e.g., plaintext) may have different cipher text after being encrypted. The executable code may resolve this difference by causing the underlying hardware to decrypt the storage blocks using the respective cryptographic input of each storage block and causing the underlying hardware to encrypt the storage blocks using a common cryptographic input (e.g., common key). The common cryptographic input may enable the same or similar unencrypted content from different storage blocks to have the same or similar cipher text after being encrypted. The executable code may then compare the cipher text of multiple storage blocks to detect duplicates and update the storage to remove the duplicates.

The systems and methods described herein include technology that enables data deduplication in a security enhanced computing environment. In particular, aspects of the present disclosure may enable a kernel or other executable module to perform data deduplication on encrypted storage blocks. This may enhance the storage utilization and security of a computing system because the duplicate detection and the deduplication may be performed while the data is in an encrypted form. Aspects of the present disclosure may be performed on volatile data storage or non-volatile data storage may enhance a computer system's ability to perform data deduplication on memory resources, hard disk resources, solid-state storage resources, other storage resources, or a combination thereof.

Various aspects of the above referenced methods and systems are described in details herein below by way of examples, rather than by way of limitation. The examples provided below discuss a virtualized computer system where the data deduplication may be performed by aspects of a hypervisor, a host operating system, a virtual machine, or a combination thereof. In other examples, the data deduplication may be performed in a non-virtualized computer system that is absent a hypervisor or other virtualization or emulation features discussed below.

FIG. 1 depicts an illustrative architecture of elements of a computer system 100, in accordance with an embodiment of the present disclosure. It should be noted that other architectures for computer system 100 are possible, and that the implementation of a computer system utilizing embodiments of the disclosure are not necessarily limited to the specific architecture depicted. Computer system 100 may be a single host machine or multiple host machines arranged in a cluster and may include a rackmount server, a workstation, a desktop computer, a notebook computer, a tablet computer, a mobile phone, a palm-sized computing device, a personal digital assistant (PDA), etc. In one example, computer system 100 may be a computing device implemented with x86 hardware. In another example, computer system 100 may be a computing device implemented with PowerPC®, SPARC®, or other hardware. In the example shown in FIG. 1, computer system 100 may include virtual machines 110A-C, hypervisor 120, hardware devices 130, and network 140.

Virtual machine 110A-C may execute guest executable code that uses an underlying emulation of the physical resources. The guest executable code may include a guest operating system, guest applications, guest device drivers, etc. Each of the virtual machines 110A-C may support hardware emulation, full virtualization, para-virtualization, and operating system-level virtualization. Virtual machines 110A-C may have the same or different types of guest operating systems, such as Microsoft®, Windows®, Linux®, Solaris®, etc.

Hypervisor 120 may also be known as a virtual machine monitor (VMM) and may provide virtual machines 110A-C with access to one or more features of the underlying hardware. In the example shown, hypervisor 120 may run directly on the hardware of computer system 100 (e.g., bare metal hypervisor). In other examples, hypervisor 120 may run on or within a host operating system (not shown). Hypervisor 120 may manage system resources, including access to hardware devices 130. In the example shown, hypervisor 120 may include a storage analysis component 122 and a data deduplication component 124. Components 122 and 124 may each be separated into one or more components or may be included within the same component.

Storage analysis component 122 may analyze a storage device 134 to determine portions of storage device 134 that have an increased chance (e.g., higher probability) of containing duplicate content and to prepare the content for comparison. Storage analysis component 122 may analyze aspects of one or more storage blocks (e.g., time, location) and may select multiple storage blocks that are likely to include the same or similar content. Storage analysis component 122 may then prepare the content of the selected storage blocks for a subsequent comparison by initiating the computer system 100 to encrypt the one or more storage blocks using the same cryptographic input (e.g., common key).

Data deduplication component 124 may compare the storage blocks and subsequently remove duplicate content. Data deduplication component 124 may compare the encrypted storage blocks by comparing the cipher text of each of the selected storage blocks. When the storage blocks contain the same or similar cipher text, the data deduplication component 124 may infer that the underlying unencrypted content is duplicative. Data deduplication component 124 may then update the storage device to remove the duplicate content and reconfigure references that pointed to the duplicate content to subsequently point to the same storage block. The features of storage analysis component 999 and data deduplication component 999 are discussed in more detail below in regards to FIG. 2.

Hardware devices 110 may provide hardware functionality for performing computing tasks. Hardware devices 130 may include one or more processing devices 132A, 132B, and one or more storage devices 134, or combination thereof. One or more of these hardware devices may be split up into multiple separate devices or consolidated into one or more hardware devices. Some of the hardware device shown may be absent from hardware devices 130 and may instead be partially or completely emulated by executable code.

Processing devices 132A and 132B may include one or more processors that are capable of executing the computing tasks discussed above in regards to components 122 and 124. Processing devices 132A and 132B may be a single core processor that is capable of executing one instruction at a time (e.g., single pipeline of instructions) or may be a multi-core processor that simultaneously executes multiple instructions. The instructions may encode arithmetic, logical, or I/O operations and may be used to execute a cryptographic function that performs encryption or decryption of data within storage device 134.

Storage device 134 may include volatile or non-volatile data storage. Volatile data storage (e.g., non-persistent storage) may store data for any duration of time but may lose the data after a loss of power or power cycle. Non-volatile data storage (e.g., persistent storage) may store data for any duration of time and may retain the data beyond a loss of power. In one example, storage device 134 may include one or more registers (e.g., processor registers) or memory devices (e.g., main memory). In another example, storage device 134 may include one or more mass storage devices, such as hard drives, solid-state storage (e.g., Solid State Drives), other data storage devices, or a combination thereof. In a further example, storage device 134 may include a combination of one or more registers, one or more memory devices, one or more mass storage devices, other data storage devices, or a combination thereof, which may be arranged in a cache hierarchy. Storage device 134 may store data within one or more storage blocks 136A-Z.

Storage blocks 136A-Z may be any physical data storage or logical data storage for storing, organizing, or accessing data. A storage block may include a contiguous or non-contiguous sequence of bytes or bits. A storage block may have a block size which may be the same or different from a physical block size of the underlying hardware. The block size may be a fixed-size, such as a particular integer value (e.g., 4 KB) or may be a variable-size that varies within a range of integer values. Each of the storage blocks 136A-Z may have the same block size or may have different block sizes. In one example, storage blocks 136A-Z may be memory blocks and each memory block may correspond to a memory page, multiple memory pages, or a portion of a memory page. In another example, each of the storage blocks 136A-Z may correspond to a portion (e.g., sector) of a mass storage device (e.g., hard disk) or other storage device.

Network 140 may be a public network (e.g., the internet), a private network (e.g., a local area network (LAN) or wide area network (WAN)), or a combination thereof. In one example, network 140 may include a wired or a wireless infrastructure, which may be provided by one or more wireless communications systems, such as a wireless fidelity (WiFi) hotspot connected with the network 140 and/or a wireless carrier system that can be implemented using various data processing equipment, communication towers, etc.

Figure 2:
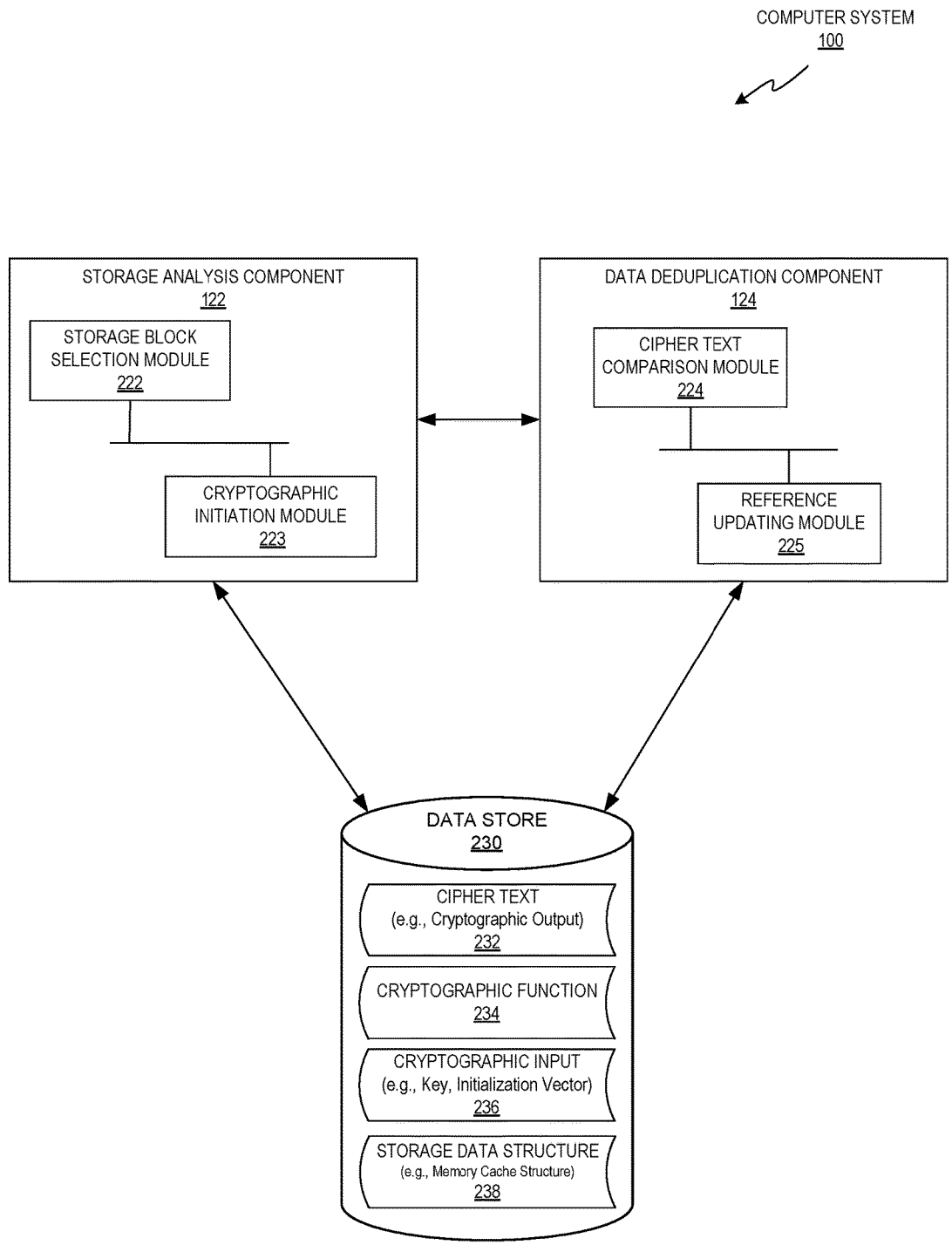
FIG. 2 depicts a block diagram illustrating components and modules of an example computer system, in accordance with one or more aspects of the present disclosure.

FIG. 2 is a block diagram illustrating example components and modules of computer system 100, in accordance with one or more aspects of the present disclosure. In the example shown, computer system 100 may include a storage analysis component 122 and a data deduplication component 124.

Storage analysis component 122 may enable computer system 100 to analyze one or more storage devices to identify portions of the storage devices that may contain duplicate content and to prepare the content for comparison. Storage analysis component 122 may include a storage block selection module 222 and a cryptographic initiation module 223.

Storage block selection module 222 may analyze data associated with one or more storage blocks to identify storage blocks that have an increased probability of containing duplicate data. The data associated with the storage blocks may be any data that relates to a particular storage block or group of storage blocks and may include temporal data, spatial data, contextual data, other data, or a combination thereof. The temporal data associated with a storage block may be any data related to a time or frequency of access, modification, creation, deletion, or other operation that affects the one or more storage block. The spatial data may be any data that relates to the location of one or more storage blocks with respect to the storage device. The locations may be a particular location (e.g., address) or a relative location (e.g., adjacent to) and may include logical locations (e.g., virtual address or address range) or physical locations (e.g., physical address or address range) of the storage block. The contextual data may be any data that provides a context of a storage block or content within the storage block and may indicate a particular thread, process, user, host, virtual machine, or a combination thereof is associated with a specific storage block.

The temporal data, spatial data, or contextual data associated with the storage blocks may be analyzed and or weighted to calculate a similarity score. The similarity score may be a probabilistic value that indicates the probability that separate storage blocks or groups of storage blocks include the same or similar content data. The probabilistic value may be represented in any form such as decimals, fractions, percentages, ratios, other forms, or combination thereof. Storage block selection module 222 may select one or more storage blocks in view of the similarity score. For example, storage block selection module 222 may select one or more storage blocks that exceed (e.g., above or below) a predetermined threshold. Storage block selection module 222 may identify particular storage blocks or groups of storage blocks and may pass these storage blocks to cryptographic initiation module 223.

Cryptographic initiation module 223 may process the one or more storage blocks so that the storage blocks can be compared to identify duplicate data. As discussed above, the storage blocks may be encrypted using different cryptographic input and this may cause the same content data to be presented as different cipher text, which may make the detection of duplicate data challenging. Cryptographic initiation module 223 may cause multiple storage blocks to be encrypted using the same cryptographic function and cryptographic input (e.g., cryptographic key) so that similar content data can be represented as similar cipher text 232.

Cipher text 232 may be any form of encrypted data and need not be able to be represented in a textual format. Cipher text may be represented as binary data, textual data, image data, other data, or a combination thereof. Cipher text may be the result of encrypting unencrypted content (e.g., plaintext) or further encrypting previously encrypted content. Cipher text 232 may be the output of cryptographic function 234.

Cryptographic function 234 may be any function that is suitable for use in a standardized or proprietary cryptographic protocol and may involve one or more mathematical manipulations of content data. Cryptographic function 234 may map data of an arbitrary size to a bit sequence of a fixed size or variable size. In one example, cryptographic function 234 may be a cryptographic hash function that takes a content message as input and outputs a hash value, which may be referred to as cipher text, a digest, or a message digest. Cryptographic function 234 may include a private key cryptographic function a public key cryptographic function, other cryptographic function, or a combination thereof. In one example, cryptographic function 234 may be an "in-place" cryptographic function or include similar functionality that avoids copying the first storage block to another location during the execution of the cryptographic function (e.g., during encryption or decryption).

An in-place cryptographic function may transform data within a storage block without using auxiliary data storage in the storage device. This may involve the content of the storage block being overwritten by the output of the cryptographic function while the cryptographic function executes. In one example, the in-place cryptographic function may use only the storage space of a single storage block and may update data within the storage block by swapping or replacing portions of data. In another example, the in-place cryptographic function may use a small amount of auxiliary data within the storage block or elsewhere for indices or pointers (e.g., counter pointers). The small amount of auxiliary storage space may be proportionate to the size of the unencrypted content and in one example may be $O(\log n)$, $O(n)$, or other portion of "n", wherein "n" is the number of bits or bytes of the unencrypted content data.

Cryptographic input 236 may include any data that is used by cryptographic function 234 to encrypt or decrypt content data. Cryptographic input 236 may be any cryptographic bit sequence including encryption keys, decryption keys, public keys, private keys, symmetric keys, asymmetric keys, other cryptographic data, or a combination thereof. Cryptographic input 236 may include or be generated or derived from one or more initialization vectors, starting variables, other data, or a combination thereof. Cryptographic input 236 may include or be based on the spatial data, temporal data, or contextual data discussed above. In one example, cryptographic input 236 may include a cryptographic bit sequence that is based on spatial data that is specific to the hardware devices, storage devices, storage blocks, or combination thereof. For example, the cryptographic input 236 may be based on data that is permanently or temporarily associated with the hardware device, such as hardware identification information or a physical memory address of a particular storage block. The latter example may cause each storage block to be associated with different cryptographic input 236 and therefore the cipher text of identical content may be different. In another example, the same cryptographic input 236 may be used for separate storage blocks, which may be referred to as using a common cryptographic input (e.g., common key). The common cryptographic input may be used to encrypt multiple storage blocks and therefor may not be specific to each individual storage block. The common cryptographic input may still be based on the spatial, temporal, or contextual data. For example, the common cryptographic input may be based on a particular virtual machine that the storage block is assigned to or associated with.

Cryptographic initiation module 223 may prepare the content of the selected storage blocks for a subsequent comparison by initiating the computer system 100 to encrypt the one or more storage blocks using the same cryptographic function 234 and the same cryptographic input (e.g., a common key). In one example, the underlying hardware may execute the cryptographic function 234 without providing a higher-level executable code (e.g., kernel of hypervisor or host operating system) access to the cryptographic function, cryptographic input, unencrypted content, or a combination thereof. In another example, the cryptographic function may be executed by the kernel of the hypervisor or host operating system in combination with hardware and lower-level code (e.g., firmware). The kernel of the hypervisor or host operating system may execute the cryptographic function 234 without providing a higher-level executable code (e.g., kernel of guest operating system) access to the cryptographic function, cryptographic input, unencrypted content, or a combination thereof. In either scenario, the portion of the higher-level code executing the data deduplication may not be capable of unencrypting the storage blocks because it may be exclusively performed by lower level executable code and/or hardware. This may be advantageous because reducing access to the cryptographic keys and unencrypted data may enhance security.

Cryptographic initiation module 223 may cause computer system 100 to encrypt the storage blocks with common cryptographic input by initiating a migration of the encrypted data. As discussed above, the data may be encrypted using a cryptographic key that is linked to the hardware and therefore may be inaccessible if the encrypted content were copied to another machine with different hardware. For example, if the data is encrypted using a hardware specific cryptographic key (e.g., based on physical address), then the new machine may not be capable of using its hardware specific cryptographic key (e.g., corresponding decryption key) to decrypt the content. Many systems address this by including support for a migration procedure that decrypts and then encrypts the data using common cryptographic input. The common cryptographic input may include one or more transport keys that enables the encrypted data to be transported (e.g., moved, migrated, or copied) to another machine. The common cryptographic input may be generated by the higher-level executable code before, during, or after initiating the migration or may be generated by lower-level executable code before, during, or after initiating the migration. In either situation, the common cryptographic input may be accessed and interpreted by the higher-level executable code (e.g., code performing data deduplication) and is not hidden or concealed from the higher-level executable code like the previously used cryptographic key. In one example, cryptographic initiation module 223 may initiate underlying support for the migration of the encrypted content without an intent to actually migrate the encrypted data. Instead, cryptographic initiation module 223 may use the migration functionality to cause the encrypted data to be encrypted using the common cryptographic input so that data deduplication component 124 can detect and remove duplicate data.

Data deduplication component 124 may determine whether the content of multiple encrypted storage blocks include duplicate data and may remove some or all of the duplicate content. When comparing the content data of a storage block, not all of the data may need to be compared because some of the data within a storage block may be extraneous data (e.g., padding or unoccupied). Therefore, storage blocks with similar but not identical content may still be determined to be duplicates because they contain at least some identical content. In the example shown in FIG. 2, data deduplication component 124 may include a cipher text comparison module 224 and a reference updating module 225.

Cipher text comparison module 224 may enable computer system 100 to compare the encrypted content (e.g., cipher text) of different storage blocks to determine whether the storage blocks contain duplicate unencrypted content. The comparison may be performed with access to only the encrypted content (cipher text, digest) and without access to the unencrypted content (e.g., plain text, message). In one example, cipher text comparison module 224 may directly compare the cipher text of a storage block with the cipher text of one or more other storage blocks. In another example, cipher text comparison module 224 may indirectly compare multiple storage blocks by comparing data representative of the cipher text such as a hash of the cipher text or one or more portions of the cipher text.

Reference updating module 225 may update a storage data structure 238 to remove one or more duplicate storage blocks. Storage data structure 238 may include one or more references that correspond to one or more storage blocks. Each reference may identify (e.g., point to) the beginning, middle, end, or other portion of the one or more storage blocks. When a first storage block and a second storage block are determined to be duplicates, reference updating module 225 may update the storage data structure 238 to change a reference to the first storage block to subsequently reference the second storage block. As a result, the references for the first storage block and the second storage block may point to the identical storage block (i.e., second storage block). This may effectively remove the first block by de-referencing the first storage block so that it can be subsequently reused, reallocated, flushed, wiped, or other action.

Storage data structure 238 may be a memory cache data structure or it may be another storage data structure that corresponds to a caching system, a file system, a database system, other storage system, or a combination thereof. In one example, storage data structure 238 may be an address-translation cache (e.g., Translation Lookaside Buffer (TLB)) that translates between virtual and physical memory locations (e.g., memory addresses). The memory cache data structure may include one or more pointer entries (e.g., Page Table Entries (PTE)) that point to respective storage blocks (e.g., memory pages). After detecting duplicates, reference updating module 225 may update the memory cache data structure by invalidating the pointer entries for one or more of the duplicate storage blocks and may flush the address-translation cache to remove references to or the content of the duplicates.

Figure 3:
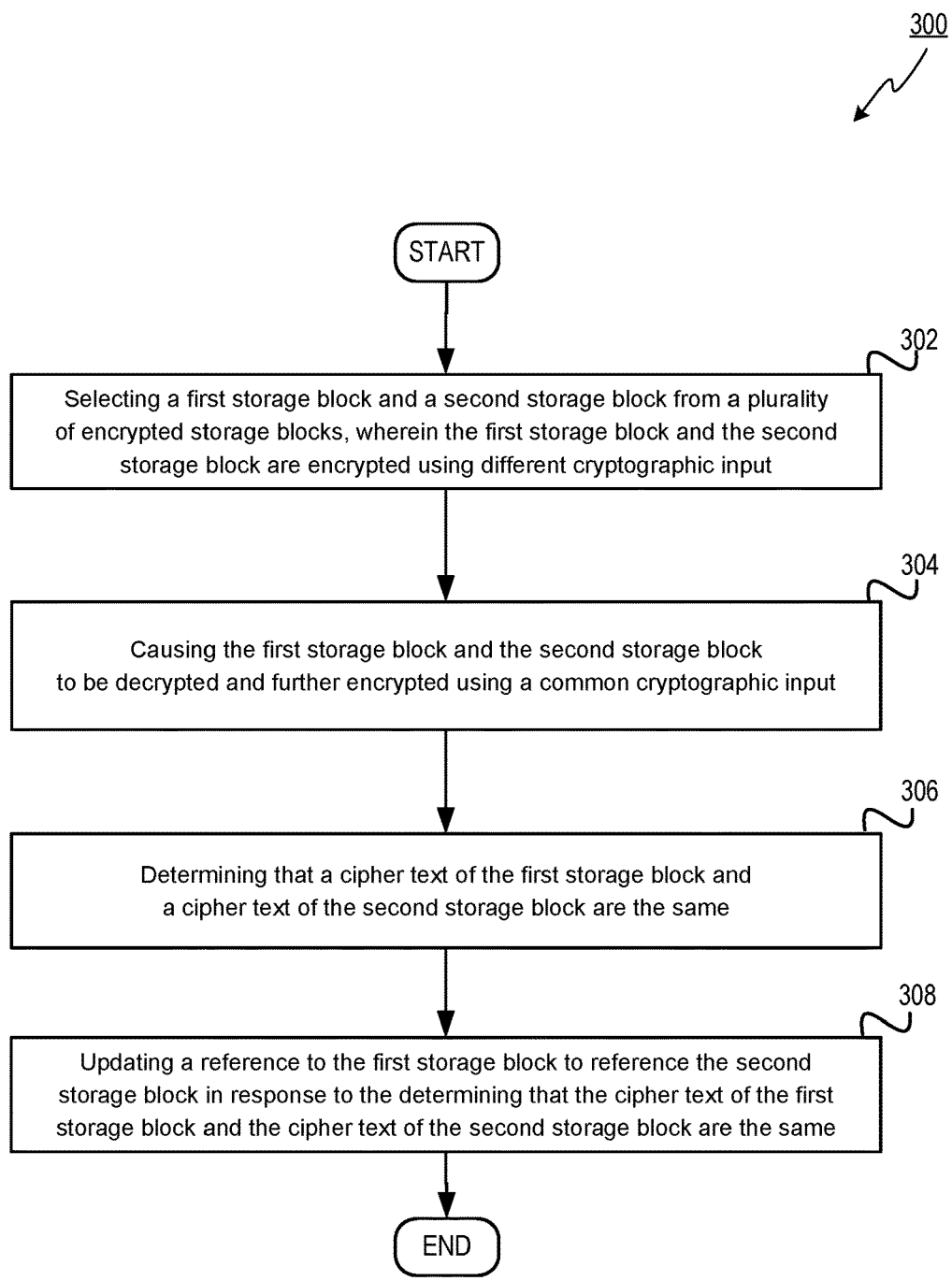
FIG. 3 depicts a flow diagram of an example method for performing data deduplication of a storage device while the data is encrypted, in accordance with one or more aspects of the present disclosure.

FIG. 3 depicts a flow diagram of an illustrative example of a method 300 for performs data deduplication of a storage device while the data in the storage device is encrypted, in accordance with one or more aspects of the present disclosure. Method 300 and each of its individual functions, routines, subroutines, or operations may be performed by one or more processors of the computer device executing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processes implementing method 300 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by a kernel of a hypervisor as shown in FIG. 1 or by an executable code of a host machine (e.g., host operating system or firmware), a virtual machine (e.g., guest operating system or firmware), other executable code, or a combination thereof.

Method 300 may be performed by processing devices of a server device or a client device and may begin at block 302. At block 302, the processing device may select a first storage block and a second storage block from a plurality of encrypted storage blocks, wherein the first storage block and the second storage block are encrypted using different cryptographic input. In one example, the first storage block and the second storage block may be selected from the plurality of encrypted storage blocks in view of a heuristic that uses a modification time of the first and second storage blocks. The first storage block and the second storage block may exist in a volatile data storage device (e.g., main memory) and may each be encrypted using a key that is based on a physical address of the respective storage block. In one example, the first and second storage blocks may correspond to different virtual machines running on the same hypervisor.

At block 304, the processing device may cause the first storage block and the second storage block to be decrypted and further encrypted using a common cryptographic input. The common cryptographic input may be used to encrypt multiple storage blocks and therefor may not be specific to each individual storage block. In one example, the first and second storage blocks correspond to a particular virtual machine (e.g., the same virtual machine), and wherein the common cryptographic input is a cryptographic bit sequence generated by the hypervisor in view of data associated with the particular virtual machine. The decryption and subsequent encryption (e.g., re-encryption) may be done using different keys. In one example, the processing device may decrypt the second storage block of data using a decryption key based on a first cryptographic key and the first cryptographic key may be based on a physical address of the second storage block. The processing device may then encrypt the second storage block using an encryption key based on the second cryptographic key, which includes or is based on the common cryptographic input. After determining the cipher text of the first storage block and the cipher text of the second storage block are the same the processing device may return the second storage block to its original encryption using an encryption key based on the first cryptographic key. In one example, the first and second cryptographic keys may be accessible to a hardware device performing a cryptographic function and the first and second cryptographic keys or corresponding decryption keys may be concealed (e.g., inaccessible, unavailable, hidden) from a kernel performing the data deduplication. In another example, the first cryptographic key or the corresponding decryption key may be concealed from the kernel performing the data deduplication and the second cryptographic key may be accessible to the kernel. In either example, the kernel may be a portion of a host operating system, a hypervisor, a guest operating system, or a combination thereof.

At block 306, the processing device may determine that a cipher text of the first storage block and a cipher text of the second storage block are the same. The determination may be based on a comparison and the comparison may be performed with access to only the encrypted content (cipher text, digest) without access to the unencrypted content (e.g., plain text, message). In one example, the processing device may directly compare the cipher text of a storage block with the cipher text of one or more other storage blocks. In another example, the processing device may indirectly compare multiple storage blocks by comparing data representative of cipher text such as a hash of the cipher text or one or more portions of the cipher text.

At block 308, the processing device may update a reference to the first storage block to reference the second storage block in response to the determining that the cipher text of the first storage block and the cipher text of the second storage block are the same. In one example, the first storage block and the second storage block may be duplicate memory pages and updating the reference may remove one of the duplicate memory pages. Updating of the reference may involve updating a page table entry (PTE) and invalidating the corresponding entry within a translation lookaside buffer (TLB). The page table entry may correspond to the first storage block and after the update may include a pointer to the physical address of the second storage block instead of the physical address of the first storage block. Updating the reference may also involve invalidating page table entries that correspond to the first storage block and the second storage block and flushing the translation lookaside buffer. Responsive to completing the operations described herein above with references to block 308, the method may terminate.

Figure 4:
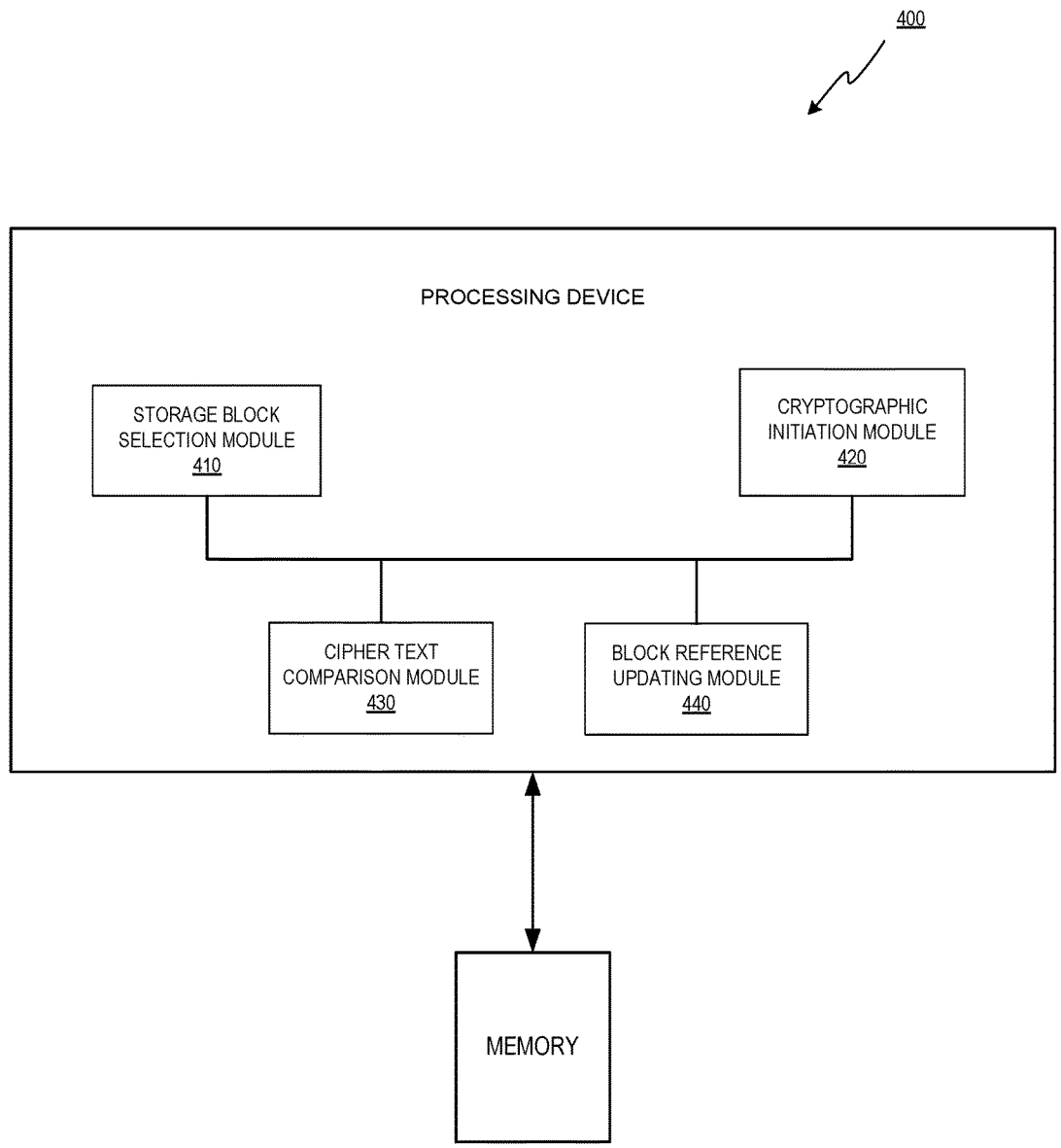
FIG. 4 depicts a block diagram of an example computer system in accordance with one or more aspects of the present disclosure.

FIG. 4 depicts a block diagram of a computer system 400 operating in accordance with one or more aspects of the present disclosure. Computer system 400 may be the same or similar to computer system 100 and may include one or more processing devices and one or more memory devices. In the example shown, computer system 400 may include a storage block selection module 410, a cryptographic initiation module 420, a cipher text comparison module 430, and a block reference updating module 440.

Storage block selection module 410 may instruct the processing device to select a first storage block and a second storage block from a plurality of encrypted storage blocks, wherein the first storage block and the second storage block are encrypted using different cryptographic input. In one example, the first storage block and the second storage block may be selected from the plurality of encrypted storage blocks in view of a heuristic that uses a modification time of the first and second storage block. The first storage block and the second storage block may exist in a volatile data storage device (e.g., main memory) and may each be encrypted using a key that is based on a physical address of the respective storage block. In one example, the first and second storage block may correspond to different virtual machines running on the same hypervisor.

Cryptographic initiation module 420 may instruct the processing device to cause the first storage block and the second storage block to be decrypted and further encrypted using a common cryptographic input. The common cryptographic input may be used to encrypt multiple storage blocks and therefor may not be specific to each individual storage block. In one example, the first and second storage blocks correspond to a particular virtual machine (e.g., the same virtual machine), and wherein the common cryptographic input is a cryptographic bit sequence generated by the hypervisor in view of data associated with the particular virtual machine. The decryption and subsequent encryption (e.g., re-encryption) may be done using different keys. In one example, the processing device may decrypt the second storage block of data using a decryption key based on a first cryptographic key and the first cryptographic key may be based on a physical address of the second storage block. The processing device may then encrypt the second storage block using an encryption key based on the second cryptographic key, which includes or is based on the common cryptographic input. After determining the cipher text of the first storage block and the cipher text of the second storage block are the same the processing device may return the second storage block to its original encryption using an encryption key based on the first cryptographic key. In one example, the first and second cryptographic keys may be accessible to a hardware device performing a cryptographic function and the first and second cryptographic keys or corresponding decryption keys may be concealed (e.g., inaccessible, unavailable, hidden) from a kernel performing the data deduplication. In another example, the first cryptographic key or the corresponding decryption key may be concealed from the kernel performing the data deduplication and the second cryptographic key may be accessible to the kernel. In either example, the kernel may be a portion of a host operating system, a hypervisor, a guest operating system, or a combination thereof.

Cipher text comparison module 430 may instruct the processing device to determine that a cipher text of the first storage block and a cipher text of the second storage block are the same. The determination may be based on a comparison and the comparison may be performed with access to only the encrypted content (cipher text, digest) without access to the unencrypted content (e.g., plain text, message). In one example, the processing device may directly compare the cipher text of a storage block with the cipher text of one or more other storage blocks. In another example, the processing device may indirectly compare multiple storage blocks by comparing data representative of cipher text such as a hash of the cipher text or one or more portions of the cipher text.

Block reference updating module 440 may instruct the processing device to update a reference to the first storage block to reference the second storage block in response to the determining that the cipher text of the first storage block and the cipher text of the second storage block are the same. In one example, the first storage block and the second storage block may be duplicate memory pages and updating the reference may remove one of the duplicate memory pages. Updating of the reference may involve updating a page table entry (PTE) within a translation lookaside buffer (TLB). The page table entry may correspond to the first storage block and after the update may include a pointer to the physical address of the second storage block instead of the physical address of the first storage block. Updating the reference may also involve invalidating page table entries that correspond to the first storage block and the second storage block and flushing the translation lookaside buffer.

Figure 5:
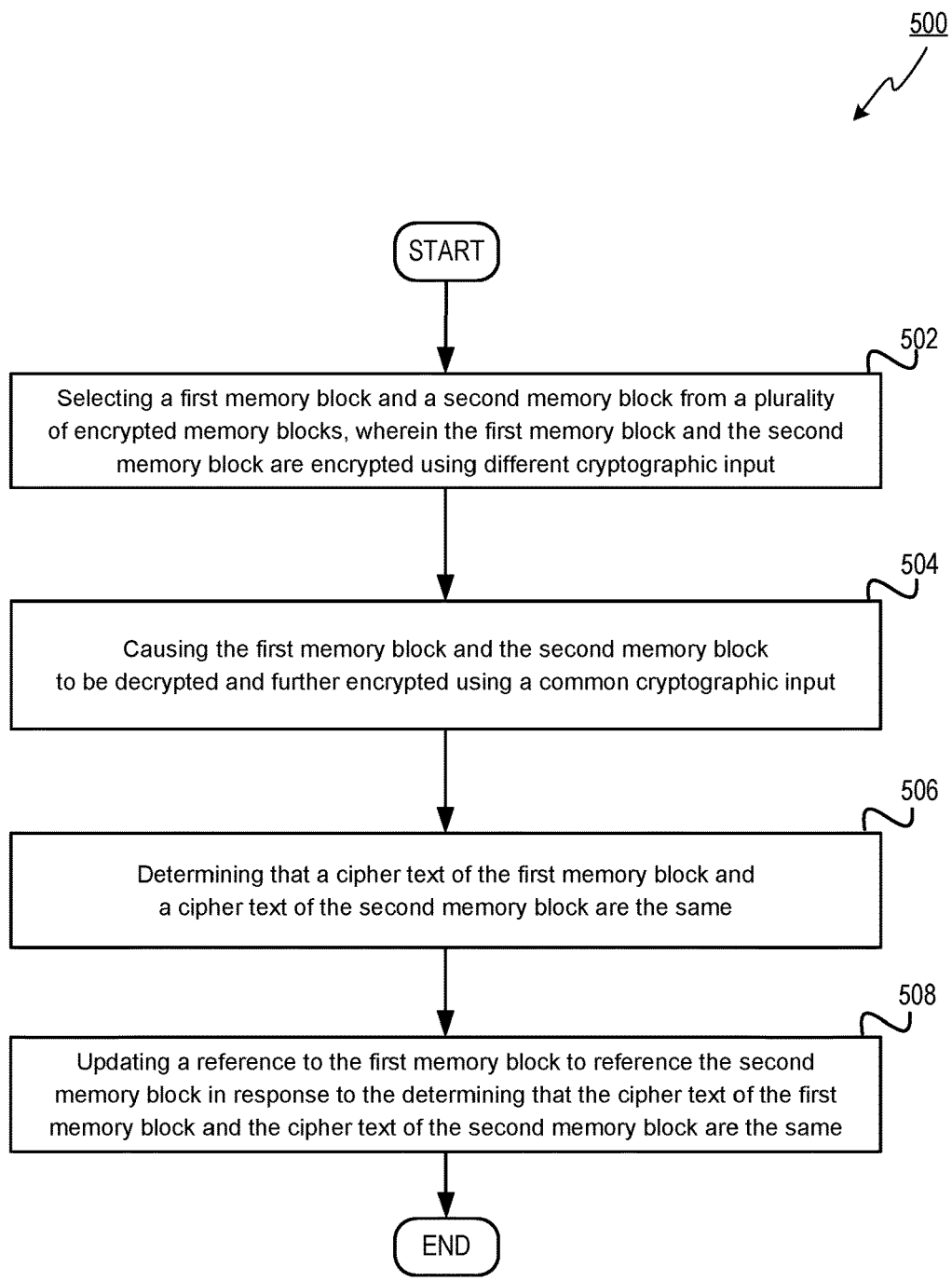
FIG. 5 depicts a flow diagram of another example method for performing data deduplication on memory blocks while data within the memory blocks is encrypted, in accordance with one or more aspects of the present disclosure.

FIG. 5 depicts a flow diagram of one illustrative example of a method 500 for performing data deduplication of a storage device while the data on the storage device is encrypted, in accordance with one or more aspects of the present disclosure. Method 500 may be similar to method 300 and may be performed in the same or a similar manner as described above in regards to method 300. Method 500 may be performed by processing devices of a server device or a client device and may begin at block 502. At block 502, the processing device may select a first memory block and a second memory block from a plurality of encrypted memory blocks, wherein the first memory block and the second memory block are encrypted using different cryptographic input. In one example, the first memory block and the second memory block may be selected from the plurality of encrypted memory blocks in view of a heuristic that uses a modification time of the first and second memory block. The first memory block and the second memory block may exist in a volatile data storage device (e.g., main memory) and may each be encrypted using a key that is based on a physical address of the respective memory block. In one example, the first and second memory block may correspond to different virtual machines running on the same hypervisor.

At block 504, the processing device may cause the first memory block and the second memory block to be decrypted and further encrypted using a common cryptographic input. The common cryptographic input may be used to encrypt multiple memory blocks and therefor may not be specific to each individual memory block. In one example, the first and second memory blocks correspond to a particular virtual machine (e.g., the same virtual machine), and wherein the common cryptographic input is a cryptographic bit sequence generated by the hypervisor in view of data associated with the particular virtual machine. The decryption and subsequent encryption (e.g., re-encryption) may be done using different keys. In one example, the processing device may decrypt the second storage block of data using a decryption key based on a first cryptographic key and the first cryptographic key may be based on a physical address of the second storage block. The processing device may then encrypt the second storage block using an encryption key based on the second cryptographic key, which includes or is based on the common cryptographic input. After determining the cipher text of the first storage block and the cipher text of the second storage block are the same the processing device may return the second storage block to its original encryption using an encryption key based on the first cryptographic key. In one example, the first and second cryptographic keys may be accessible to a hardware device performing a cryptographic function and the first and second cryptographic keys or corresponding decryption keys may be concealed (e.g., inaccessible, unavailable, hidden) from a kernel performing the data deduplication. In another example, the first cryptographic key or the corresponding decryption key may be concealed from the kernel performing the data deduplication and the second cryptographic key may be accessible to the kernel. In either example, the kernel may be a portion of a host operating system, a hypervisor, a guest operating system, or a combination thereof.

At block 506, the processing device may determine that a cipher text of the first memory block and a cipher text of the second memory block are the same. The determination may be based on a comparison and the comparison may be performed with access to only the encrypted content (cipher text, digest) without access to the unencrypted content (e.g., plain text, message). In one example, the processing device may directly compare the cipher text of a memory block with the cipher text of one or more other memory blocks. In another example, the processing device may indirectly compare multiple memory blocks by comparing data representative of cipher text such as a hash of the cipher text or one or more portions of the cipher text.

At block 508, the processing device may update a reference to the first memory block to reference the second memory block in response to the determining that the cipher text of the first memory block and the cipher text of the second memory block are the same. In one example, the first memory block and the second memory block may be duplicate memory pages and updating the reference may remove one of the duplicate memory pages. Updating of the reference may involve updating a page table entry (PTE) within a translation lookaside buffer (TLB). The page table entry may correspond to the first memory block and after the update may include a pointer to the physical address of the second memory block instead of the physical address of the first memory block. Updating the reference may also involve invalidating page table entries that correspond to the first memory block and the second memory block and flushing the translation lookaside buffer. Responsive to completing the operations described herein above with references to block 508, the method may terminate.

Figure 6:
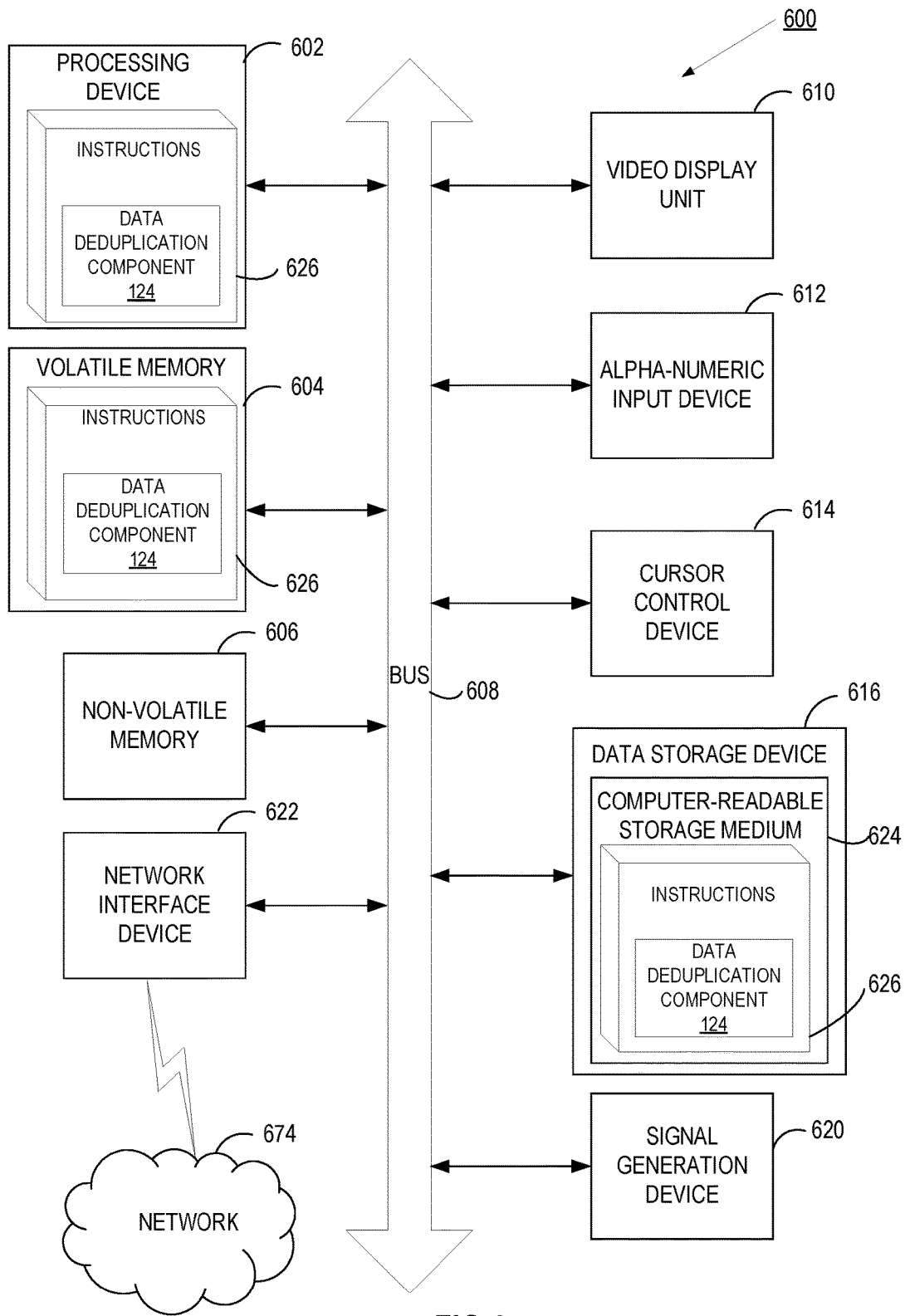
FIG. 6 depicts a block diagram of an illustrative computing device operating in accordance with the examples of the present disclosure.

FIG. 6 depicts a block diagram of a computer system operating in accordance with one or more aspects of the present disclosure. In various illustrative examples, computer system 600 may correspond to computer system 100 of FIG. 1. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a computing device to translate these requests to the underlying physical computing hardware resources. This type of virtualization results in multiple VMs sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alpha-numeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions for implementing methods 300 or 500 and for encoding batched page hinting component 134 and modules illustrated in FIGS. 1 and 2.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "initiating," "transmitting," "receiving," "analyzing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
    selecting a first storage block and a second storage block from a plurality of encrypted storage blocks, wherein the first storage block is encrypted using a cryptographic bit sequence that is based on spatial data of the first storage block and the second storage block is encrypted using a cryptographic bit sequence that is based on spatial data of the second storage block;
    causing the first storage block and the second storage block to be decrypted and to be encrypted using a common cryptographic input;
    determining that a cipher text of the first storage block and a cipher text of the second storage block are the same; and
    updating, by a processing device, a reference to the first storage block to reference the second storage block in response to the determining that the cipher text of the first storage block and the cipher text of the second storage block are the same.

2. The method of claim 1, further comprising, removing the first storage block in response to the determining that the cipher text of the first storage block and the cipher text of the second storage block are the same.

3. The method of claim 1, wherein the first storage block and the second storage block exist in a volatile data storage device.

4. The method of claim 1, wherein the first storage block and the second storage block are duplicate memory pages, and wherein updating the reference removes one of the duplicate memory pages.

5. The method of claim 1, wherein the first storage block and the second storage block are each encrypted using a key that corresponds to a physical address of the respective storage block.

6. The method of claim 1, wherein the first storage block and the second storage block correspond to a particular virtual machine, and wherein the common cryptographic input is a cryptographic bit sequence generated by a hypervisor in view of data associated with the particular virtual machine.

7. The method of claim 1, wherein the common cryptographic input comprises a cryptographic bit sequence of a hypervisor and a cryptographic bit sequence of a hardware device that is concealed from the hypervisor.

8. The method of claim 1, wherein the first storage block and the second storage block correspond to different virtual machines that are managed by a hypervisor.

9. The method of claim 1, wherein the selecting the first storage block and the second storage block comprises selecting the first storage block and the second storage block from the plurality of encrypted storage blocks in view of a heuristic that uses a modification time of the first storage block and a modification time of the second storage block.

10. The method of claim 1, wherein the decryption and the encryption use an in-place cryptographic function that avoids copying the first storage block to another location during the encryption and during the decryption.

11. The method of claim 1, further comprising:
    decrypting the second storage block of data using a decryption key based on a first cryptographic key, wherein the first cryptographic key is in view of a physical address of the second storage block;
    encrypting the second storage block using an encryption key based on a second cryptographic key comprising the common cryptographic input; and
    encrypting the second storage block using an encryption key based on the first cryptographic key, responsive to determining the cipher text of the first storage block and the cipher text of the second storage block are the same.

12. The method of claim 11, wherein the first cryptographic key and the second cryptographic key are accessible to a hardware device performing a cryptographic function and are concealed from a kernel performing data deduplication, wherein the kernel is a portion of at least one of a host operating system, hypervisor, or guest operating system.

13. The method of claim 11, wherein the first cryptographic key is concealed from a kernel and the second cryptographic key is accessible to the kernel, wherein the kernel is a portion of at least one of a host operating system, hypervisor, or guest operating system.

14. The method of claim 1, wherein updating the reference comprises updating a page table entry and invalidating a corresponding entry within a translation lookaside buffer, wherein the page table entry corresponds to the first storage block and comprises a pointer to the physical address of the second storage block.

15. The method of claim 14, wherein updating the reference comprises:
    updating entries that correspond to the first storage block and the second storage block; and
    flushing the translation lookaside buffer.

16. A system comprising:
    a memory;
    a processing device operatively coupled to the memory, the processing device to:
        select a first storage block and a second storage block from a plurality of encrypted storage blocks, wherein the first storage block is encrypted using a cryptographic bit sequence that is based on spatial data of the first storage block and the second storage block is encrypted using a cryptographic bit sequence that is based on spatial data of the second storage block;
        cause the first storage block and the second storage block to be decrypted and to be encrypted using a common cryptographic input;
        determine that a cipher text of the first storage block and a cipher text of the second storage block are the same; and
        update a reference to the first storage block to reference the second storage block in response to the determining that the cipher text of the first storage block and the cipher text of the second storage block are the same.

17. The system of claim 16, wherein the processing device is further to remove the first storage block in response to the determining that the cipher text of the first storage block and the cipher text of the second storage block are the same.

18. The system of claim 16, wherein the first storage block and the second storage block are duplicate memory pages, and wherein updating the reference removes one of the duplicate memory pages.

19. A non-transitory machine-readable storage medium storing instructions that cause a processing device to:

select a first memory block and a second memory block from a plurality of encrypted memory blocks, wherein the first memory block is encrypted using a cryptographic bit sequence that is based on spatial data of the first memory block and the second memory block is encrypted using a cryptographic bit sequence that is based on spatial data of the second memory block;

cause the first memory block and the second memory block to be decrypted and to be encrypted using a common cryptographic input;

determine that a cipher text of the first memory block and a cipher text of the second memory block are the same; and update a reference to the first memory block to reference the second memory block in response to the determining that the cipher text of the first memory block and the cipher text of the second memory block are the same.

20. The non-transitory machine-readable storage medium of claim 19, wherein the processing device is further to remove the first memory block in response to the determining that the cipher text of the first memory block and the cipher text of the second memory block are the same.

* * * * *